United States Patent
Hurlburt et al.

(10) Patent No.: US 6,267,198 B1
(45) Date of Patent: Jul. 31, 2001

(54) OFFSET KINGPIN FOR A REAR STEERING AXLE ON AN AGRICULTURAL COMBINE

(75) Inventors: Joseph C. Hurlburt; Edward H. Priepke, both of Lancaster; Bryant F. Webb, Ephrata, all of PA (US)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 09/470,745

(22) Filed: Dec. 23, 1999

(51) Int. Cl.[7] .................................................. B62D 5/06
(52) U.S. Cl. ..................... 180/414; 280/91.1; 280/103
(58) Field of Search .................. 280/91.1, 93.512, 280/98, 99, 103; 180/408, 409, 410, 412, 413, 414, 415, 445, 906

(56) References Cited

U.S. PATENT DOCUMENTS

| 2,193,752 | 3/1940 | Yungling . |
| 2,256,366 | 9/1941 | Weston . |
| 2,566,565 | 9/1951 | Hill . |
| 4,359,123 | * 11/1982 | Haupt et al. . |
| 4,846,198 | * 7/1989 | Carnewal et al. . |
| 6,131,691 | * 10/2000 | Morch . |

\* cited by examiner

*Primary Examiner*—Kevin Hurley
(74) *Attorney, Agent, or Firm*—John William Stader; Larry W. Miller

(57) ABSTRACT

The invention consists of an offset kingpin in the rear steering axle of a self-propelled combine harvester. Attached to the rear axle is a knuckle. The kingpin is pivotally attached to the knuckle and the spindle is rotationally attached to the knuckle. The kingpin is positioned forward of the spindle allowing the rear tires equal clearance with the combine side shielding. This positioning of the kingpin relative to the spindle improves the turning radius of the combine. It also aids tire stability at road speeds.

13 Claims, 3 Drawing Sheets

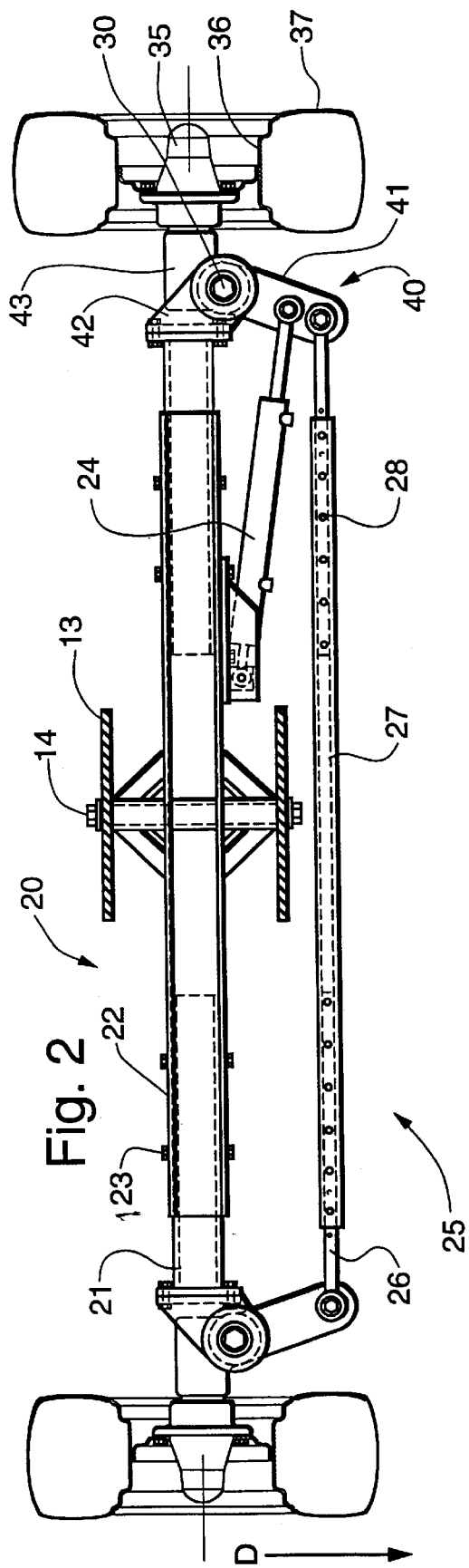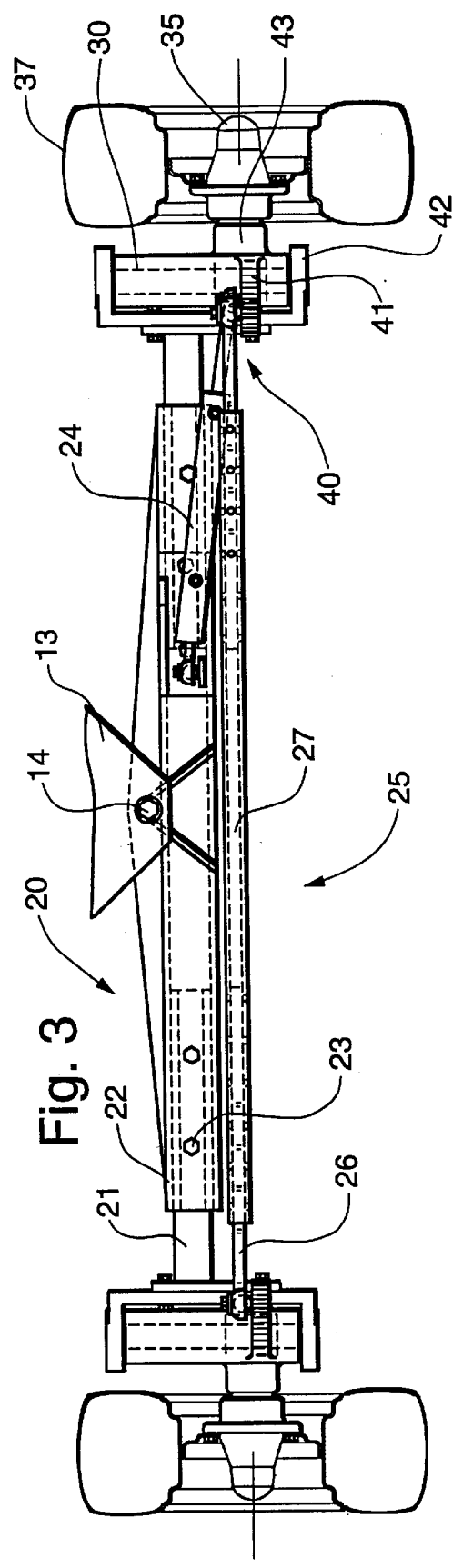

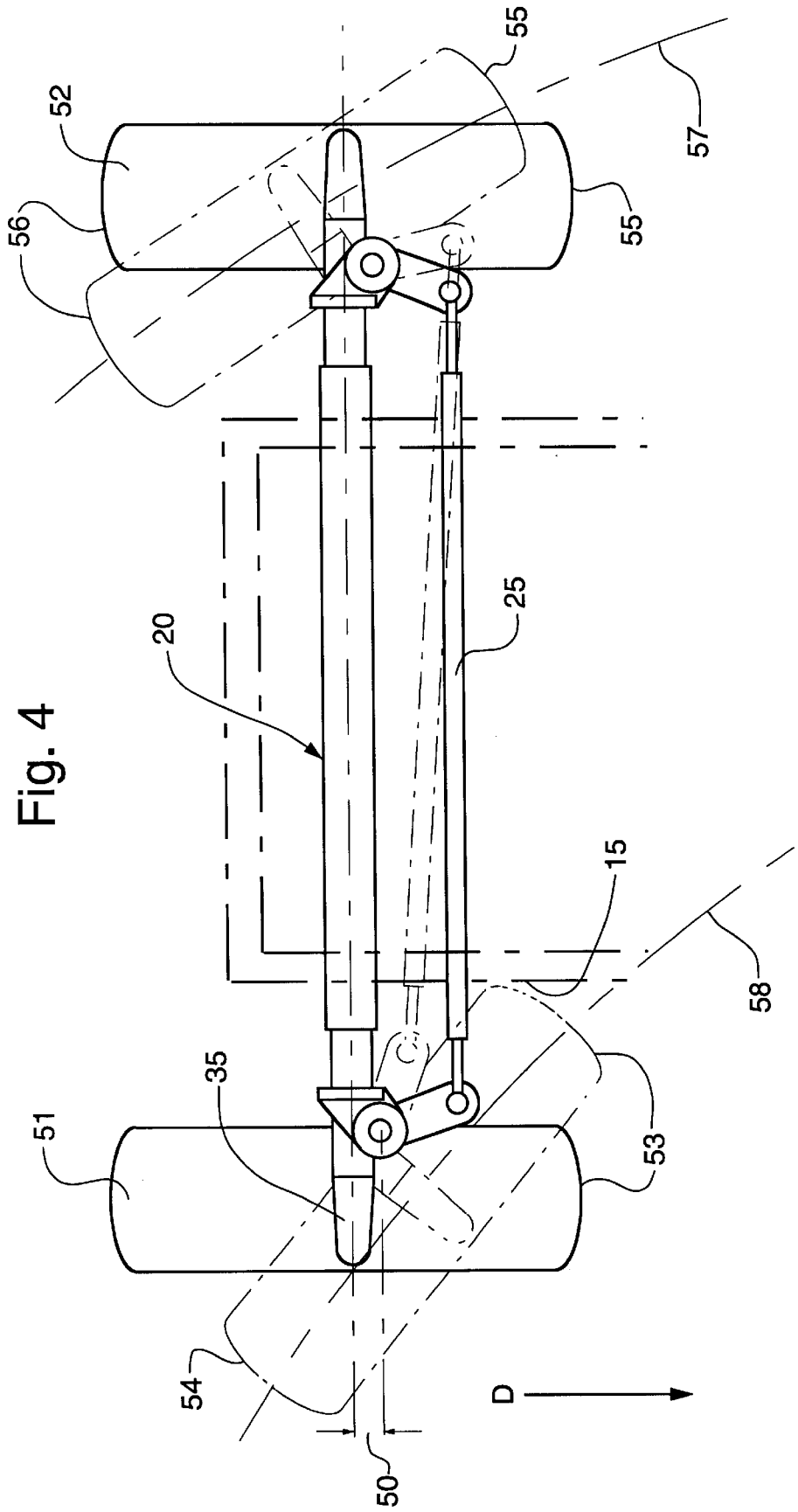

OFFSET KINGPIN FOR A REAR STEERING AXLE ON AN AGRICULTURAL COMBINE

BACKGROUND OF INVENTION

1. Field of Art

This invention relates to the improvement of the rear steering axle on an agricultural combine. More specifically, the invention is an offset kingpin for the rear steering axle on a combine.

2. Description of Prior Art

Mechanical harvesting of grain has taken place for decades. However, efforts continue in the attempt to make harvesting operations more efficient and effective. A combine harvester generally includes a header, which cuts the crop. The header then moves the cut crop into a feeder house. The feeder house lifts the cut crop into the threshing, separation and cleaning areas of the combine. The grain is separated from the stalk by a rotor or cylinder threshing system. The grain is then separated and moved and stored in a grain tank. The chaff and trash are deposited from the rear of the combine. The grain stored in the grain tank is eventually discharged through a grain tank unload tube. An operator usually runs these various operations from a glass-enclosed cab. Typically, the cab is located above and behind the header and feederhouse. There are a variety of agricultural combine harvesters and their operations are well known in the art. For examples of such harvesters reference U.S. Pat. No. 4,846,198 which illustrates the conventional and twin rotor threshing and separating systems of a harvester as well as other major systems of the harvester. See also the New Holland Super Conventional Combines TX™ 66, TX™ 68, the New Holland TWIN ROTOR® combines TR® 89 and TR®99 for examples of existing conventional and twin rotor harvesters. U.S. Pat. No. 4,332,262 also illustrates the primary systems of a conventional harvester. For further details regarding various agricultural harvester systems review U.S. Pat. Nos. 4,522,553, 4,800,711, 4,866,920, 4,907,402, 4,967,544 and 5,155,984. See also the New Holland corn head model 996 and the New Holland grain belt header model 994 for details regarding headers.

The previously indicated, the combine moves across a field to harvest crop. Two pairs of wheels supports the combine. Typically, larger front wheels are driven and the smaller rear (optionally driven) wheels are attached to a steerable rear axle. As with most land vehicles, the wheels are steered. Specifically, the inner tire (the tire closest to the center of the turn) is steered through a greater angle than the outer tire. Presently there are several difficulties incumbent with this approach on an agricultural combine. Because of the shielding and chaff spreader the rear tires contact the shielding. This limits the turning radius available for the rear tires. Furthermore, as agricultural combines have grown in size and complexity, so has the requirement for larger tires. This further decreases the clearance between the tires and shielding. Many two wheel drive tractors and automobiles have used spindles which trail their kingpins. This aids highway steering stability. With a front steering axle common on these vehicles, this exaggerates the inner and outer tire chassis clearance problems. However, the tire width and chassis clearance can be modified to avoid this issue on such vehicles. This option is not viable on a rear steering axle on an agricultural combine. There is equipment that must be placed behind and next to the rear wheels in order to have a successful farming operation. The prior art illustrates these drawbacks. U.S. Pat. No. 2,193,752 illustrates a steering mechanism on a front axle of a motor vehicle. U.S. Pat. No. 2,256,366 again illustrates an offset kingpin in the front axle of a vehicle. U.S. Pat. No. 2,566,565 discloses a vehicle steering knuckle mechanism for effecting sharp turns. Again, the disclosure reveals a front axle of relatively simply pull-type vehicle.

A rear steering axle that would improve the turning radius of an agricultural combine while not diminishing the clearance between the rear tires and the combine side shielding would be a great improvement. An invention that could resolve these issues would represent an improvement to the art.

OBJECTS OF THE INVENTION

It is an object of the present invention to provide an improved rear steering axle on an agricultural combine.

It is an object of the present invention to provide an offset kingpin on the rear steering axle of an agricultural combine.

It is an object of the present invention to provide kingpin to steering tire footprint geometry that aids driving stability.

It is an object of the present invention to provide a rear steering axle that improves the clearance between the edges of the rear tire and shielding of an agricultural combine.

It is an object of the present invention to provide an extendable rear steering axle having an offset kingpin.

SUMMARY OF THE INVENTION

The invention is an improvement to the rear steering axle on an agricultural combine. The invention consists of an offset kingpin on an extendable rear steering axle. The rear axle has an outer axle with a telescoping inner axle. Attached to the inner axle is a knuckle. The knuckle has a kingpin yoke, spindle housing and tie rod attach member. An extendable tie rod is attached to the tie rod attach member. The kingpin is positioned in the kingpin yoke. The spindle is inserted into the spindle housing. When viewing the invention parallel to the direction of travel, the kingpin is positioned forward of the spindle. This allows for greater wheel clearance of the inner tire and balanced frame clearance for the inner and outer tires. This design also improves the turning radius of the entire vehicle. Driving stability is aided by having the kingpin axis leading the center of the tire footprint.

BRIEF DESCRIPTION OF DRAWINGS

The advantages of this invention will be apparent upon consideration of the following detailed disclosure of the invention, especially when taken in conjunction with the accompanying drawings wherein:

FIG. 2 is a rotated horizontal sectional view taken on the line 2—2 of FIG. 1.

FIG. 3 is a front vertical elevational view of the assembly shown in FIG. 2.

FIG. 4 is a schematic plan view similar to FIG. 2, but showing the rear steering wheels in the straight-ahead position and in the maximum right turn position.

DETAILED DESCRIPTION OF THE INVENTION

Figure 1:
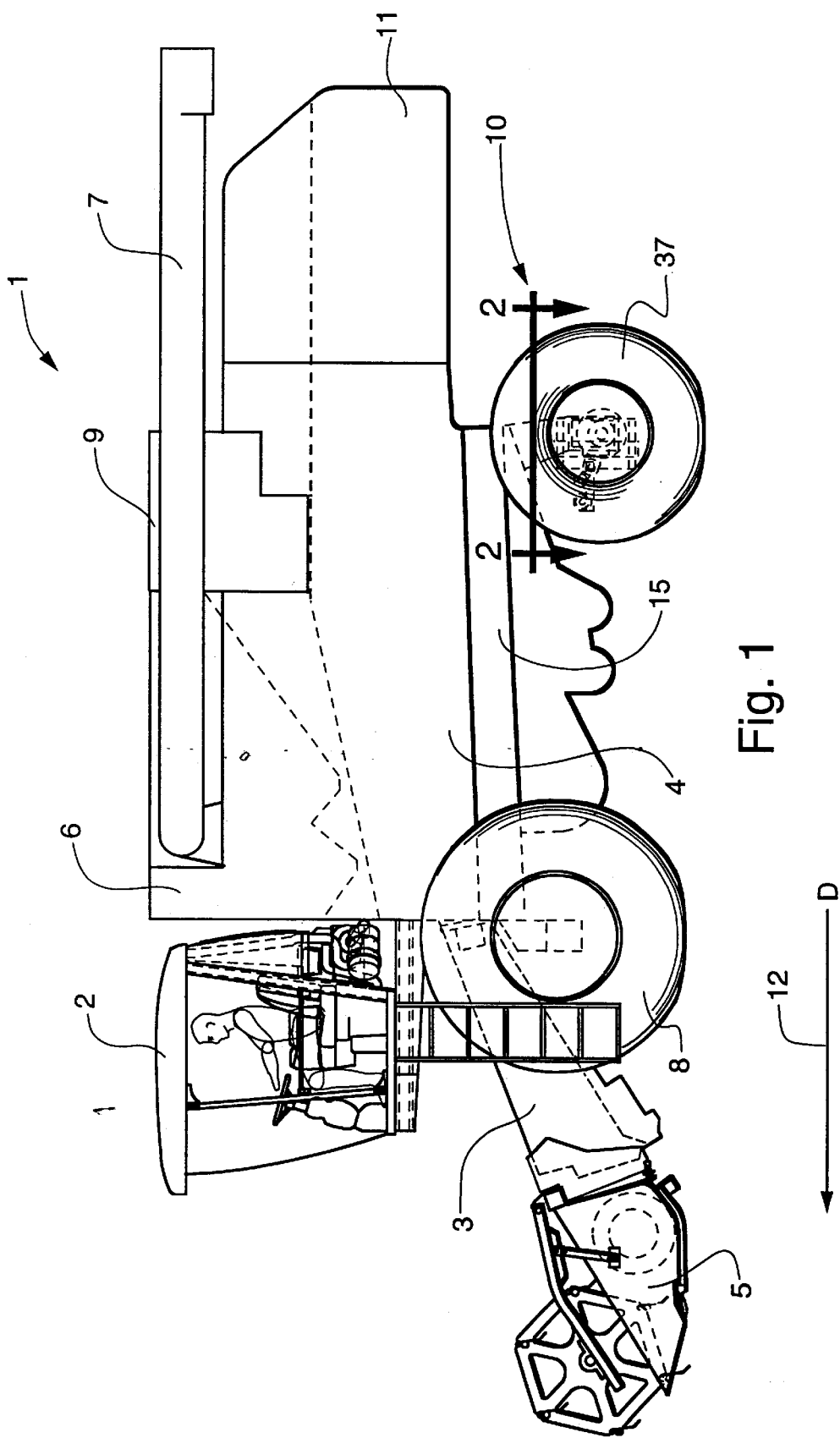
FIG. 1 is a side elevation of a combine.

Referring to the drawings, it is possible to observe the major elements and general operation of the present invention. Left and right references are used as a matter of convenience and are determined by standing at the rear of the combine and facing the forward end in the normal direction of travel. Likewise, forward and rearward are determined by normal direction of travel of the combine. D defines the typical forward direction of travel. Upward or downward orientations are relative to the ground or operating surface. Horizontal or vertical planes are also relative to ground.

As seen in FIG. 1, the invention is located on a typical twin rotor combine 1 having a pair of front wheels 8 (only one shown) and a pair of rear wheels 37 (only one shown) for providing movement over the ground. At the front of the combine is a header 5 for cutting a crop. As the combine 1 and header 5 are moved forward, the header cuts the grain and stalk. The header moves the grain into an auger trough. A transverse auger pushes the grain and stalk in the auger trough to the center of the header. The header may be positioned and re-positioned relative to the ground. The header may also be tilted to the left or right or may be positioned relatively high or low to the ground. These features are constantly being adjusted depending on the terrain and crop conditions. Moveable headers are well known and established in the art. Located at the rear center of the header is the feederhouse 3 or elevator. The feederhouse 3 moves the grain and stalks rearward into the threshing, separation, cleaning and clean grain systems 4 of the combine 1. There are a variety of different threshing, separation, cleaning and clean grain systems 4 which are numerous and well known by those skilled in the art. After processing, separation and cleaning the grain is stored in a grain tank 6 located near the top of the combine 1. The grain is transferred from the grain tank 6 to a transport vehicle by an unload auger tube 7. Usually during the harvesting operations, the unloading auger remains un-driven and the grain tank unload auger tube 7 remains retracted as shown in FIG. 1. However, the combine can be unloaded 'on the go'. A separate vehicle such as a truck or tractor-pulled grain cart drives beside the moving combine. The processed grain is discharged while the combine and receiving vehicle are moving. The trash or chaff is ejected from the rear of the combine by a chaff spreader 11. The operator controls the combine 1 from the cab 2 located behind the header and at the front of the combine. From the cab 2 the operator can observe most of the various combine functions. The cab 2 usually has a large glass window or several windows which afford the operator the maximum ability to monitor the header. The combine 1 and various systems are powered by an engine 9 generally positioned at the rear of the combine 1. Most of the major systems in a combine are discussed and well known in the prior art.

The present invention is an offset kingpin for a rear steering axle 10 positioned behind the front wheels 8. The elements of the present invention may also be viewed in FIGS. 2 and 3. The rear axle is generally symmetrical in nature, so a description of only one half of the axle is necessary. The invention 10 is shown on an extendable rear axle 20. The axle 20 has an outer axle 22 with a telescoping inner axle 21. Depending on the row crop being harvested, the inner axle 21 may be extended or retracted within the outer axle. Several axle bolts 23 are used to affix the inner 21 and outer 22 axles together. The axle 20 is pivotally attached to the rest of the combine support frame at a pivot point 14. The pivoting axle 20 allows all four wheels to follow the ground contours. The pivoting axle 20 further allows for the agricultural combine to the remain horizontal so that the threshing, cleaning and separation systems remain level and not unbalanced.

Affixed at the outer end of the inner axle 21 is the knuckle 40. As seen in FIG. 2 and 3, the knuckle 40 has a kingpin yoke 42, tie rod attach member 41 and spindle housing 43. The conventional spindle (not visible) consists of a spindle hub 35 is rotationally mounted to the spindle housing 43. A wheel 36 or rim is attached to the spindle hub 35. Mounted to the wheel 36 is a tire 37. There is an extendable tie rod 25 having an outer rod 27 and a telescoping inner rod 26. Several tie rod bolts 28 affix the inner 26 and outer 27 rods to each other. The outer ends of the inner tie rods 26 are pivotally attached to the tie rod attach member 41. The kingpin 30 is inserted in the kingpin yoke 42. Movement of the knuckle, and consequently the tire, is achieved by means of a turning cylinder 24 pivotally affixed to the outer axle 22 and the tie rod attach member 41. In the present embodiment a single cylinder 24 is used, however a pair synchronized cylinder's one on each end of the axle as well as a mechanical linkage, could be used to move the knuckle.

As best seen in FIG. 4, by locating the kingpin 43 in front of the spindle, it is possible to improve the inner tire 51 and outer tire 52 turning radius' while at the same time preventing these tires from contacting the combine's siding or shielding 15. Specifically, with traditional tire to frame or shielding clearance at the front of the rear inner tire 53, an increased steering angle is allowed. While steered a lessor; but complementary steering angle, the rear of the rear outer tire 56 has frame or shielding clearance equal to that of the front of the rear inner tire 53. Rear tires 37 are positioned rearward of kingpins 30. This aids tire stability, especially when travelling at road speeds. As previously noted, this improves the turning radius of the entire combine. In the present embodiment, the distance or offset between the kingpin 30 and spindle hub 35 when viewed from a plane parallel to the direction of travel D, is 5 inches.

It will be obvious to those skilled in the art that various changes may be made without departing from the scope of the invention and the invention is not to be considered limited to what is illustrated in the drawings and described in the specification.

What is claimed is:

1. An agricultural combine, comprising:
    a. said agricultural combine having a forward direction of travel, a cab and shielding, said combine having a front axle positioned forwardly of a rear steering axle when the combine is travelling in the forward direction;
    b. a spindle hub rotationally connected to the rear steering axle, a wheel and a tire affixed to the spindle hub;
    c. an offset kingpin pivotally attached to the rear steering axle, said kingpin positioned forwardly from the spindle hub when the combine is travelling in the forward direction;
    d. an inner rear tire having a shorter turning distance than an outer rear tire while the combine is turning;
    e. the inner rear tire having a front edge which is positioned proximate to the combine shielding without contacting said shielding; and
    f. the outer rear tire having a rear edge which is positioned proximate to the combine shielding without contacting said shielding.

2. The offset kingpin described in claim 1 wherein the rear steering axle further comprises:
    a. an outer axle; and
    b. an inner axle coaxial and adjustably affixed to the outer axle by an axle bolt, the spindle hub rotationally connected to the inner axle and the kingpin pivotally affixed to the inner axle.

3. The offset kingpin described in claim 2 further comprising a knuckle affixed to the inner axle.

4. The offset kingpin described in claim 3 wherein the knuckle further comprises:
  a. a tie rod attach member;
  b. a kingpin yoke for receiving the kingpin; and
  c. a spindle housing for receiving the spindle hub.

5. The offset kingpin described in claim 4 further comprising an extendable tie rod further comprising:
  a. an outer tie rod; and
  b. an inner tie rod coaxial and adjustably affixed to the outer tie rod by a tie rod bolt, said inner tie rod pivotally affixed to the tie rod attach member.

6. The offset kingpin described in claim 5 wherein the rear steering axle is pivotally attached to the combine.

7. The offset kingpin described in claim 6 further comprising a turning cylinder having an end pivotally affixed to the outer axle and an opposite end pivotally affixed to the tie rod attach member.

8. A self-propelled agricultural harvester comprising:
  a. a front axle affixed to the harvester, the harvester having a cab and shielding;
  b. a steerable rear axle pivotally affixed to the harvester; the rear axle positioned rearwardly of the front axle when the harvester is travelling in a forward direction of travel, the rear axle further comprising:
    i. an outer axle pivotally affixed to the combine;
    ii. an inner axle pivotally coaxial and affixed to the outer axle by an axle bolt;
    iii. an extendable tie rod;
  c. a spindle hub rotationally connected to the inner axle, a wheel and a tire affixed to the spindle hub;
  d. an offset kingpin pivotally attached to the inner axle, the kingpin positioned forwardly from the spindle hub when the harvester is travelling in the forward direction;
  e. an inner rear tire having a shorter turning distance than an outer rear tire while the combine is turning;
  f. the inner rear tire having a front edge which is positioned proximate to the combine shielding without contacting said shielding; and
  g. the outer rear tire having a rear edge which is positioned proximate to the combine shielding without contacting said shielding.

9. The offset kingpin as described in claim 8 further comprising a knuckle having:
  a. a tie rod attach member;
  b. a kingpin yoke for receiving the kingpin; and
  c. a spindle housing for receiving the spindle hub.

10. The offset kingpin as described in claim 9 further comprising an extendable tie rod having:
  a. an outer rod; and
  b. an inner rod coaxial and adjustably affixed to the outer tie rod by a tie rod bolt, said inner tie rod pivotally affixed to the tie rod attach member.

11. The offset kingpin as described in claim 10 further comprising:
  a. a turning cylinder having an end pivotally affixed to the outer axle and an opposite end pivotally affixed to the tie rod attach member; and
  b. a tire and wheel affixed the spindle hub.

12. In a self-propelled combine harvester, said combine having an engine, a cab and shielding, said combine having a header, said header operationally connected to a threshing and separating system by a feederhouse, said threshing and separating system, said system is operationally connected to a grain tank, said grain tank operationally connected to a unload auger tube, said combine having a forward direction of travel, said combine having a front axle and a steerable rear axle, the rear axle positioned rearward of the front axle when the combine is travelling forward, said rear axle further comprising:
  a. an outer axle pivotally attached to the combine;
  b. an inner axle adjustably affixed and coaxial to the outer axial;
  c. a knuckle affixed to the inner axle, the knuckle having a kingpin yoke, a spindle housing and a tie rod attach member;
  d. an extendable tie rod having:
    i. an outer rod;
    ii. an inner rod adjustably affixed and coaxial to the outer rod, the inner rod pivotally affixed to the tie rod attach member;
  e. a turning cylinder pivotally affixed between the outer axle and tie rod attach member;
  f. a spindle hub rotationally connected in the spindle housing;
  g. a wheel and a tire affixed to the spindle hub;
  h. a kingpin pivotally attached in the kingpin yoke, said kingpin positioned forwardly from the spindle hub when the combine is traveling in the forward direction;
  i. an inner rear tire having a shorter turning distance than an outer rear tire while the combine is turning;
  j. the inner rear tire having a front edge which is positioned proximate to the combine shielding without contacting said shielding; and
  k. the outer rear tire having a rear edge which is positioned proximate to the combine shielding without contacting said shielding.

13. The improvement in claim 12 wherein a distance between the spindle and kingpin when viewed from a plane parallel to the forward direction of travel is 5 inches.

* * * * *